H. P. ARNOLD.
PROCESS OF MANUFACTURING CUTTING TOOLS.
APPLICATION FILED MAY 20, 1918.

1,290,042.

Patented Jan. 7, 1919.

Inventor.
Howard P. Arnold
by Heard Smith & Tennant.
Attys.

UNITED STATES PATENT OFFICE.

HOWARD P. ARNOLD, OF ROCKLAND, MASSACHUSETTS.

PROCESS OF MANUFACTURING CUTTING-TOOLS.

1,290,042.　　　　　Specification of Letters Patent.　　Patented Jan. 7, 1919.

Application filed May 20, 1918. Serial No. 235,466.

*To all whom it may concern:*

Be it known that I, HOWARD P. ARNOLD, a citizen of the United States, residing at Rockland, county of Plymouth, State of Massachusetts, have invented an Improvement in Processes of Manufacturing Cutting-Tools, of which the following description, in connection with the accompanying drawing, is a specification, like characters on the drawing representing like parts.

This invention relates to an improved process of manufacturing cutting tools such for example as boring, milling or end cutters.

The object of the invention is to provide a process by means of which such tools may be economically and efficiently manufactured and in which the cutters shall be held firmly and rigidly in their seats.

The object of the invention is further to provide a process in which the cutters are held in their seats by being brazed in place with a minimum amount of brazing material.

These and other objects and features of the invention will appear more fully from the accompanying description and drawings and will be particularly pointed out in the claims.

The drawings illustrate tool structures embodying the features of the invention and showing the main steps of the process or method of manufacturing.

In the process of manufacturing a cutting tool in accordance with this invention the body and shank of the tool are first formed by usual operations to present the cylindrical body 1 and shank 2 of required size. Preferably there are then formed in the body 1 suitable longitudinal concave flutes but this operation is not particularly concerned with the present invention and it may be performed at this stage or at a later period in the process of manufacture. The cutting or forming of these flutes in the body is principally for the purpose of providing clearance.

Figure 1:
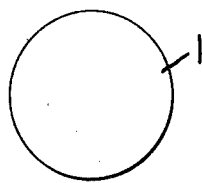
Figure 1 is an end view of the steel body of a cutting tool such as a reamer or end cutter.
Figure 2:
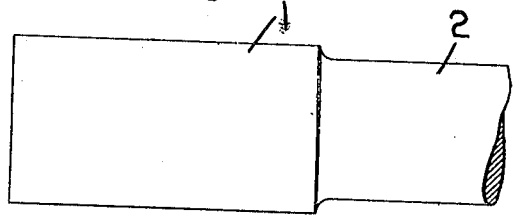
Fig. 2 is a side elevation of the body and a portion of the shank of the tool.
Figure 3:
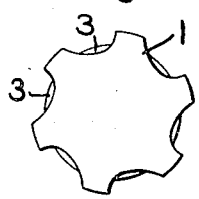
Fig. 3 is an end view showing the tool after suitable longitudinal flutes have been cut into the body.
Figure 4:
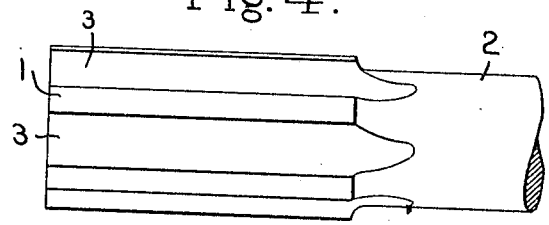
Fig. 4 is a side view of the tool after it has been fluted.
Figure 5:
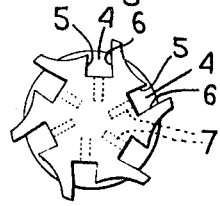
Fig. 5 is an end view of the tool in which the seats have been cut for the cutting blades with recesses for holding the brazing material shown in dotted lines.
Figure 6:
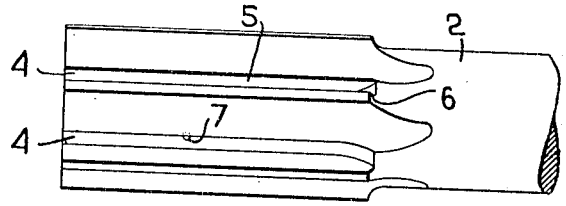
Fig. 6 is a side view of the tool fluted and with the blade seats and recesses for the brazing material formed therein.

The second step of the process consists in forming longitudinal cutter blade seats 4 in the body of the tool with the side walls 5 and 6 converging slightly outwardly. Preferably but not essentially in the broader scope of the invention the side walls 5 and 6 of these cutter seats also converge slightly toward the shank 2. The degree of convergence in both instances is very slight. The outward convergence of these walls is exaggerated in Fig. 5 and the convergence toward the shank would be so slight as not to be noticeable in the drawings.

The third step of the process consists in inserting in the bottom of the seats a small amount of brazing material which is fusible at or below the temperature required to harden the cutter blades. Any suitable brazing material such for example as copper may be used for this purpose. Preferably this step of the process is carried out by first forming in the bottoms of the cutter blade seats 4 small recesses which may be simply holes 7 drilled radially into the body and of a size sufficient to contain the required amount of brazing material, and which recesses are preferably located somewhat nearer the end of the tool than the shank, and second, in placing the brazing material in these recesses.

The fourth step of the process consists in driving endwise into the cutter seats thus formed cutter blades having their cross sections inclosed in the body corresponding substantially to the shape and size of the seats. Such cutter blades will be formed of suitable high speed or cutting steel to present a portion 8 projecting radially beyond the surface of the body 1 and a portion 9 to fit in the seats. The portion 9 corresponds substantially in cross sectional area to the cross sectional area of the seats. Consequently the side walls 10 and 11 of the cutter blades converge outwardly corresponding to the convergence of the side walls 5 and 6; and if the seats are formed with the side walls converging toward the shank as is preferable in some instances then the side walls 10 and 11 of the cutter blades likewise converge toward the shanks.

The degree of convergence in each instance both with respect to the side walls of the seats and the shanks is as has been stated very slight and may for example be in the vicinity of a few thousandths of an inch to a foot or about as required to make a driving fit.

The fifth step of the process consists in then heating the tool to the proper temperature required for hardening the blades which may be done in any suitable manner. This step simultaneously effects the melting of the brazing material inclosed between the cutter blades and the seats and causes the brazing material to flow by capillary attraction between the blades and seat walls. During this step of the process the tool may be rotated to cause gravity to aid in the flow of the brazing material. The amount of brazing material can thus be adjusted so that little or none will flow out or exude upon the surface of the body and thus render unnecessary or minimize the amount of finishing required to remove any excess of brazing material.

The sixth step of the process consists in cooling the tool in any suitable manner properly to harden the blades.

The final steps of the process are not particularly concerned with the present invention and involve the proper finishing of the tool and may all be performed by well known and usual operations.

Figure 7:
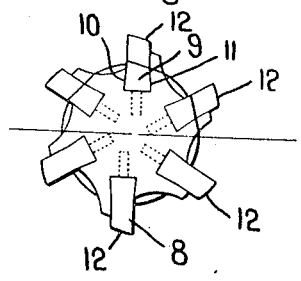
Fig. 7 is an end view of a tool the upper half indicating the tool when finished as a reamer and the lower half when finished as an end cutter.
Figure 8:
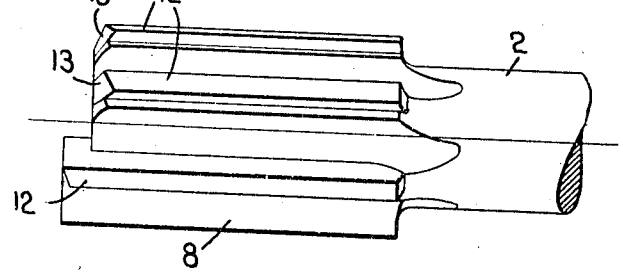
Fig. 8 is a side view of the tool shown in Fig. 7 the upper half showing the tool finished as a reamer and the lower half as an end cutter.

If the tool is to be a reamer the peripheries of the blades are backed off or relieved at 12 and the ends or points of the blades are beveled or cut back at 13 providing proper relief and thus the tool is free cutting. If the tool is to be an end cutter the blades are left projecting beyond the end of the body as shown at the bottom of Figs. 7 and 8 and the peripheries of the blades are backed off at 12 and also at the ends.

With some forms of tools, especially where the cutter blades are of a comparatively short length, the cutter blades and the cutter blade seats need not have the converging walls. The cutter blades may be forced into their seats and will be held in place by friction or by any suitable means during the brazing operation, utilizing what has hereinbefore been defined as the third, fifth and sixth steps of the process which are essential to an embodiment of the invention.

Having fully described my invention, what I claim as new and desire to secure by Letters Patent is:

1. The process of manufacturing a cutting tool which consists in first forming the body and shank, second forming longitudinal cutter blade seats therein with the side walls slightly converging outwardly, third inserting a small amount of brazing material fusible at or below the temperature required to harden the blades in the bottom of said seats, fourth driving endwise into said seats cutter blades having their cross sections inclosed in said body corresponding substantially to the shape and size of said seats, fifth heating the tool to a proper temperature for hardening the blades and thereby melting the brazing material and causing it to flow by capillary attraction between said blades and seat walls, and sixth in cooling the tool.

2. The process of manufacturing a cutting tool which consists in first forming the body and shank, second forming longitudinal cutter blade seats therein with the side walls slightly converging outwardly and also slightly converging toward the shank, third inserting a small amount of brazing material fusible at or below the temperature required to harden the blades in the bottoms of said seats, fourth driving endwise into said seats cutter blades having their cross sections inclosed in said body corresponding substantially to the shape and size of said seats, fifth heating the tool to a proper temperature for hardening the blades and thereby melting the brazing material and causing it to flow by capillary attraction between said blades and seat walls and sixth in cooling the tool.

3. The process of manufacturing a cutting tool which consists in first forming the body and shank, second forming longitudinal cutter blade seats therein with the side walls slightly converging outwardly, third forming a small recess in the bottoms of said seats and placing brazing material fusible at or below the temperature required to harden the blades in said recesses, fourth driving endwise into said seats cutter blades having their cross sections inclosed in said body corresponding substantially to the shape and size of said seats, fifth heating the tool to a proper temperature for hardening the blades and thereby melting the brazing material and causing it to flow by capillary attraction between said blades and seat walls, and sixth in cooling the tool.

4. The process of manufacturing a cutting tool which consists in first forming the body and shank, second forming longitudinal cutter blade seats therein with the side walls slightly converging outwardly and also slightly converging toward the shank, third forming a small recess in the bottoms of said seats and placing brazing material fusible at or below the temperature required to harden the blades in said recesses, fourth driving endwise into said seats cutter blades having their cross sections inclosed in said body corresponding substantially to the shape and size of said seats, fifth heating the tool to a proper temperature for hardening the blades and thereby melting the brazing material and causing it to flow by capillary attraction between said blades and seat walls, and sixth in cooling the tool.

5. The process of manufacturing a cutting tool which consists in first forming the body of the tool, second forming longitudinal cutter blade seats therein, third inserting a small amount of brazing material fusible at or below the temperature required to harden the blades in the bottom of said seats, fourth forcing into said seats cutter blades having their cross sections inclosed in said body corresponding substantially to the shape and size of said seats, fifth heating the tool to a proper temperature for hardening the blades and thereby melting the brazing material and causing it to flow by capillary attraction between said blades and seat walls, and sixth in cooling the tool.

In testimony whereof, I have signed my name to this specification.

HOWARD P. ARNOLD.

Copies of this patent may be obtained for five cents each, by addressing the "Commissioner of Patents, Washington, D. C."